(12) United States Patent
Kondo et al.

(10) Patent No.: US 7,339,617 B1
(45) Date of Patent: Mar. 4, 2008

(54) IMAGE PROVIDING DEVICE AND ITS PROVIDING METHOD, IMAGE PROCESSING DEVICE AND PROCESSING METHOD, AND STORAGE MEDIUM

(75) Inventors: Tetsujiro Kondo, Tokyo (JP); Junichi Ishibashi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/700,140

(22) PCT Filed: Mar. 13, 2000

(86) PCT No.: PCT/JP00/01511

§ 371 (c)(1),
(2), (4) Date: Feb. 5, 2001

(87) PCT Pub. No.: WO00/56075

PCT Pub. Date: Sep. 21, 2000

(30) Foreign Application Priority Data

Mar. 12, 1999 (JP) .................................. 11-066634

(51) Int. Cl.
*H04N 5/228* (2006.01)
*G06K 9/62* (2006.01)
*G06K 9/40* (2006.01)
*H04N 7/00* (2006.01)

(52) U.S. Cl. .................. 348/222.1; 382/224; 382/275; 348/36

(58) Field of Classification Search ............. 348/239.1, 348/36, 37, 38, 39; 382/275, 299, 300, 308, 382/224, 222.1
See application file for complete search history.

(56) References Cited

U.S. PATENT DOCUMENTS

| | | | | |
|---|---|---|---|---|
| 5,280,540 A | * | 1/1994 | Addeo et al. | 348/14.1 |
| 5,438,357 A | * | 8/1995 | McNelley | 348/14.1 |
| 5,652,621 A | * | 7/1997 | Adams et al. | 348/272 |
| 5,703,604 A | * | 12/1997 | McCutchen | 348/36 |
| 5,835,138 A | * | 11/1998 | Kondo | 348/207.99 |
| 6,097,434 A | * | 8/2000 | DeLeeuw | 348/335 |
| 6,243,131 B1 | * | 6/2001 | Martin | 348/36 |
| 6,476,869 B1 | * | 11/2002 | Sekine et al. | 348/335 |
| 6,593,969 B1 | * | 7/2003 | Driscoll et al. | 348/211.99 |
| 6,624,847 B1 | * | 9/2003 | Abdellatif | 348/337 |

FOREIGN PATENT DOCUMENTS

JP 59-115677 7/1984

(Continued)

*Primary Examiner*—Lin Ye
*Assistant Examiner*—Jason Whipkey
(74) *Attorney, Agent, or Firm*—Frommer Lawrence & Haug LLP; William S. Frommer; Paul A. Levy

(57) ABSTRACT

In this invention, a transmit/receive section 34 receives, from monitor, request for transmission of picture image through network and transmits, to the monitor, the entirety or a portion of picture image from which distortion has been eliminated. A memory section 33 stores picture image inputted from an image pick-up unit. An arithmetic section 32 selects the entirety or a portion of picture image stored in the memory section 33 in correspondence with request that the transmit/receive section 34 has received. A picture processing section 36 converts the entirety or a portion of picture image selected by the arithmetic section 32 into picture image from which distortion has been eliminated.

13 Claims, 14 Drawing Sheets

FOREIGN PATENT DOCUMENTS

| | | |
|---|---|---|
| JP | 6-121318 | 4/1994 |
| JP | 8-96118 | 4/1996 |
| JP | 9-505447 | 5/1997 |
| JP | 9-261522 | 10/1997 |
| WO | WO 95/06303 | 3/1995 |

* cited by examiner

NON-EDGE MATCHING

ADRC PROCESSING

REMARKED PIXEL

CLASSIFICATION PROCESSING

IMAGE PROVIDING DEVICE AND ITS PROVIDING METHOD, IMAGE PROCESSING DEVICE AND PROCESSING METHOD, AND STORAGE MEDIUM

TECHNICAL FIELD

This invention relates to a picture providing apparatus and a providing method therefor, a picture processing apparatus and a processing method thereof, and a memory medium adapted so that program for carrying out picture processing is recorded, and more particularly to a picture providing apparatus and a providing method therefor, and a picture processing apparatus and a processing method therefor for providing and processing or displaying picture image at remote place corresponding to designation, and a picture providing system using such a picture processing apparatus.

BACKGROUND ART

Followed by the fact that basis of information communication is put by development of network technology, it has become possible to transmit, on the real time basis, data of moving picture through communication network. Under such infrastructure, utilization of the technology in which video camera is installed or provided at remote place to carry out remote control of that video camera through network to view desired moving pictures is being expected in the field of security, advertisement, information guide, real estate, remote medical service and the like.

As a video camera which permits such a remote control, there are utilized pan/tilt video cameras adapted to mechanically move view point of the video camera, so called pan or tilt it with a predetermined position being as reference to change position of image pick-up to carry out zooming to change angle of visual field.

Since this pan/tilt video cameras have mechanically movable portion, there are the problems that, as compared to video cameras only electronically operative, this pan/tilt video camera is inferior in reliability and periodical maintenance is required, and because it takes a predetermined time in operation, there exists time lag until a desired picture image is transmitted.

Moreover, the pan/tilt video cameras mechanically operative cannot provide image of view points or angles of visual field of image pick-up different from each other with respect to plural users.

Further, at pan/tilt video cameras used in the state installed or provided at remote place, in order to permit image pick-up, e.g., over a broad range of substantially 360 degrees, image pick-up lens using cone-shaped mirror is used. In the image pick-up lens using cone-shaped mirror of this kind, distortion takes place from a structural point of view. In view of the above, there are provided various technologies for eliminating distortion in picture image data when the cone-shaped mirror is used to carry out image pick-up.

In addition, there are also provided image pick-up systems in which distortion of picture image at the position where user desires of picture images imaged by using the image pick-up lens using cone-shaped mirror is removed to transmit such picture image to user existing at remote place so that user can obtain desired pan or tilt picture image even if camera does not pan or tilt.

The conventionally proposed technology for eliminating distortion of picture data only converts (transforms), by coordinate conversion (transformation), pixel positions of the portions having distortion at the periphery of picture image, and cannot provide sufficient resolution and the portion having distortion is inferior as compared to the portion having no distortion from a viewpoint of picture quality.

DISCLOSURE OF THE INVENTION

This invention has been made in view of actual circumstances as described above and its object is to provide a picture providing apparatus and a providing method therefor, and a picture processing apparatus and a processing method therefor which can obtain picture image of high resolution without producing distortion.

In addition, another object of this invention is to provide a picture providing apparatus and a providing method therefor, and a picture processing apparatus and a processing method therefor which are easy in maintenance, have high reliability, and can transmit picture image without producing time lag, wherein plural users can utilize images of view points or visual field angles of image pick-up different from each other.

This invention proposed in order to attain objects as described above is directed to a picture providing apparatus adapted to input distorted picture image in which a predetermined range is collectively images from image pick-up means to provide the entirety or a portion of the picture image in accordance with request of a picture display unit, the picture providing apparatus comprising: a transmit/receive unit adapted to receive from the picture display unit, a request for transmission of picture image and to transmit, to the picture display unit, the entirety or a portion of picture image from which distortion is removed; a memory unit for storing picture image inputted from the image pick-up means; an arithmetic unit serving as selector means for selecting the entirety or a portion of picture image stored in the memory unit in correspondence with the request that the transmit/receive unit has received; and a picture conversion unit for eliminating distortion of the entirety or a portion of the picture image selected by the arithmetic unit and for converting it into high quality picture image.

Moreover, this invention is directed to a picture image providing method for a picture image providing apparatus adapted for inputting distorted picture image in which a predetermined range is imaged from an image pick-up unit to provide the entirety or a portion of picture image in accordance with request of a picture image display unit, this method including: a communication step of receiving request for transmission of picture image from the picture image display unit and of transmitting the entirety or a portion of the picture image from which distortion has been eliminated; a memory step of storing the picture image inputted from the image pick-up unit; a selection step of selecting the entirety or a portion of the picture image stored at the memory step in correspondence with the request received at the communication step; and a picture conversion step of converting the entirety or a portion of the picture image selected at the selection step into picture image from which distortion has been eliminated and of converting it into high quality picture image.

Further, this invention is directed to a memory medium for providing that computer can read, the program being adapted to execute processing including: a communication step adapted to input distorted picture image in which a predetermined range is imaged from an image pick-up unit to receive, from a picture image display unit, request for transmission of picture image with respect to a picture providing unit for providing the entirety or a portion of picture image in accordance with request of the picture image display unit, and of transmitting the entirety or a portion of the picture image from which distortion has been eliminated to the picture image display unit; a memory step of storing picture image inputted from the image pick-up unit; a selection step of selecting the entirety or a portion of the picture image stored at the memory step; and a picture image conversion step of eliminating distortion of the entirety or a portion of the picture image selected at the selection step and of converting it into high quality picture image.

Further, this invention is directed to a picture image processing apparatus, wherein this apparatus comprises an extraction circuit for extracting feature quantity every predetermined unit of picture image data having distortion, a classification circuit for carrying out classification every predetermined unit of picture data in accordance with the feature quantity extracted by the extraction circuit; and a picture image conversion unit for correcting distortion of picture data in accordance with result of the classification and for converting it into high quality picture image.

Further, this invention is directed to a picture processing method, wherein this method includes an extraction step of extracting feature quantity every predetermined unit of picture data having distortion, a classification step of carrying out classification every predetermined unit of picture data in accordance with feature quantity extracted by this extraction step, and a picture image conversion step of correcting distortion of picture data in accordance with result of the classification and of converting it into high quality picture image.

Further, this invention is directed to a memory medium, wherein there is stored program that computer can read, the program being adapted to execute processing including an extraction step of extracting feature quantity every predetermined unit of picture data having distortion, a classification step of carrying out classification every predetermined unit of picture data in accordance with the feature quantity extracted by the extraction step, and a picture image conversion step of correcting distortion of picture data in accordance with result of the classification and of converting it into high quality picture image.

Further, this invention is directed to a picture image providing system composed of an image pick-up unit, a picture providing unit and a picture display unit, wherein the image pick-up unit constituting this system includes image pick-up means for collectively imaging picture image of a predetermined range; the picture providing unit includes a first transmit/receive section adapted to receive request for transmission of picture image from the picture display unit and to transmit, to the picture display unit, the entirety or a portion of picture image from which distortion has been eliminated so that the picture image is caused to have high quality, a memory section for storing picture image inputted from the image pick-up unit, selector means for selecting the entirety or a portion of picture image that the memory section stores in correspondence with request that the first transmit/receive section has received, and a picture image converting circuit for eliminating distortion of the entirety or a portion of the picture image selected by the selector means and for converting it into high quality picture image; and the picture display unit includes a second transmit/receive section adapted to transmit request for transmission of picture image to the picture providing unit and to receive, from the picture providing unit, the entirety or a portion of picture image from which distortion has been eliminated so that the picture image is caused to have high quality.

In addition, this invention is directed to a picture providing system comprising an image pick-up unit, a picture providing unit, and a picture processing unit, wherein the image pick-up unit constituting this system includes an image pick-up section for collectively imaging picture image of a predetermined range; the picture providing unit includes a first transmit/receive section adapted to receive, from the picture image processing unit, request for transmission of picture image and to transmit the entirety or a portion of picture image to the picture processing unit, a memory section for storing picture image inputted from the image pick-up unit, and selector means for selecting the entirety or a portion of picture image that the memory section stores in correspondence with request that the first transmit/receive section has received; and the picture processing unit includes a second transmit/receive unit adapted to transmit, to the picture providing unit, request for transmission of picture image and to receive, from the picture providing unit, the entirety or a portion of the picture image, and a picture converting circuit for converting the received picture image into communication high quality picture image.

Still more further objects of this invention and more practical merits obtained by this invention will become more apparent from the description of the embodiments which will be given below.

BEST MODE FOR CARRYING OUT THE INVENTION

A picture providing apparatus and a providing method therefor, a picture processing apparatus and a processing method therefor, and a memory (recording) medium adapted so that program for carrying out picture processing is recorded according to this invention will now be described.

Figure 1:
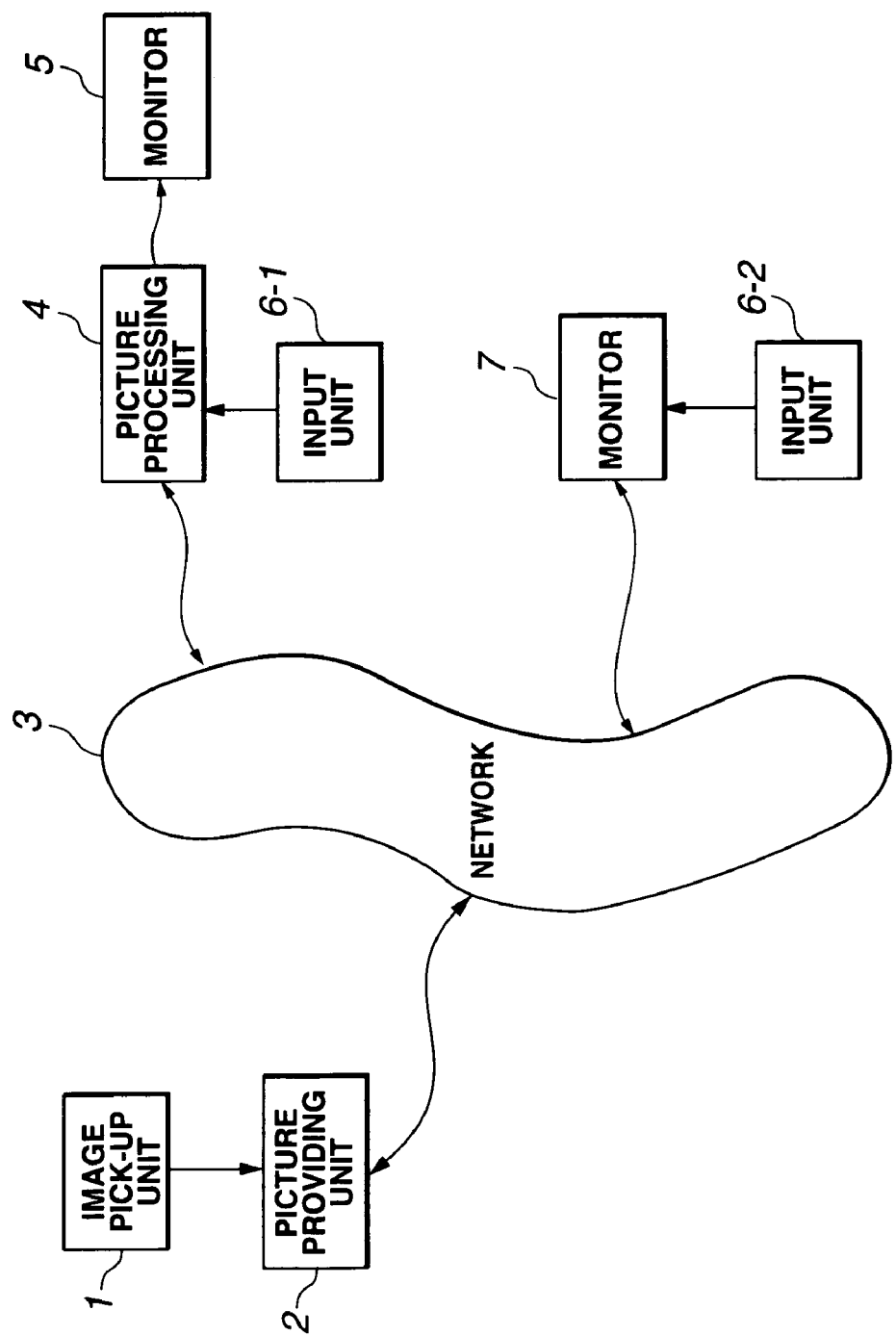
FIG. 1 is a block diagram showing a picture providing system according to this invention.

First, the picture providing system to which this invention is applied will be described. This picture providing system comprises an image pick-up unit 1 as shown in FIG. 1. The image pick-up unit 1 serves to pick up image of a predetermined object to deliver the picked up moving picture to a picture providing apparatus (unit) 2. The picture providing unit 2 serves to store picture image delivered from the image pick-up unit 1 to extract a portion or the entirety of the stored image in correspondence with transmission request from a picture processing apparatus (unit) 4 or a monitor 7 inputted through a network 3 to deliver it to the picture processing unit 4 or the monitor 7 which has outputted transmission request through the network 3.

The picture processing unit 4 inputs signal corresponding to request of user from an input unit 6-1 to transmit instruction for making a request for transmission of picture image of a predetermined view point to the picture providing unit 2 through the network 3. Moreover, the picture processing unit 4 receives picture image delivered from the picture providing unit 2 through the network 3, i.e., picture image delivered in correspondence with instruction that the picture processing unit 4 has transmitted to convert that picture image or to output the picture image to a monitor 5 as it is. The monitor 5 displays the picture image delivered from the picture processing unit 4.

The monitor 7 inputs signal corresponding to request of user from an input unit 6-2 to transmit instruction for making a request for transmission of picture image of a predetermined view point to the picture providing unit 2 through the network 3. In addition, the monitor 7 receives picture image delivered from the picture providing unit 2 through the network 3, i.e., picture image delivered in correspondence with instruction that the monitor 7 has transmitted to display this received picture image.

Figure 2:
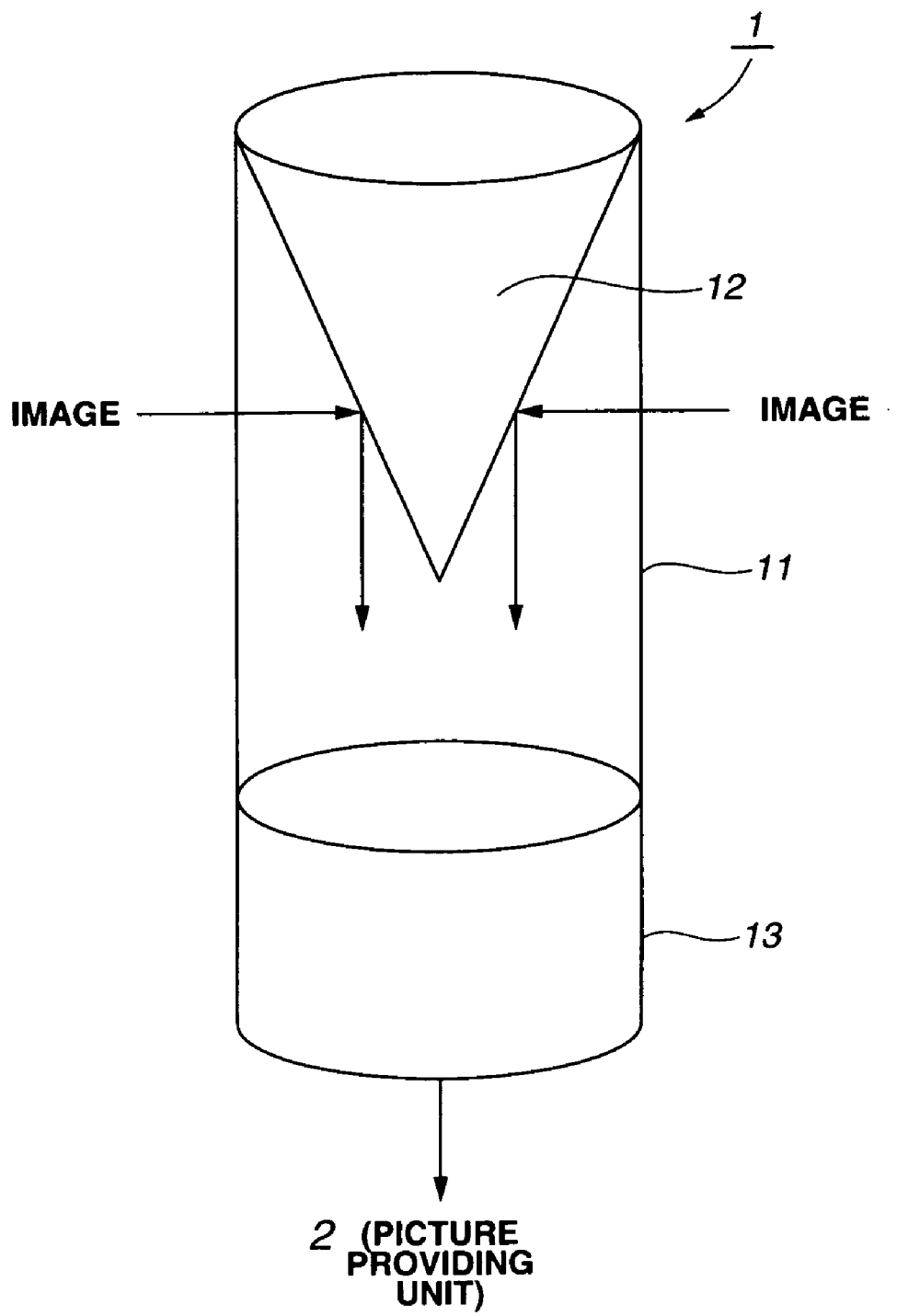
FIG. 2 is a schematic perspective view showing an image pick-up unit according to this invention used in the picture providing system.
Figure 3:
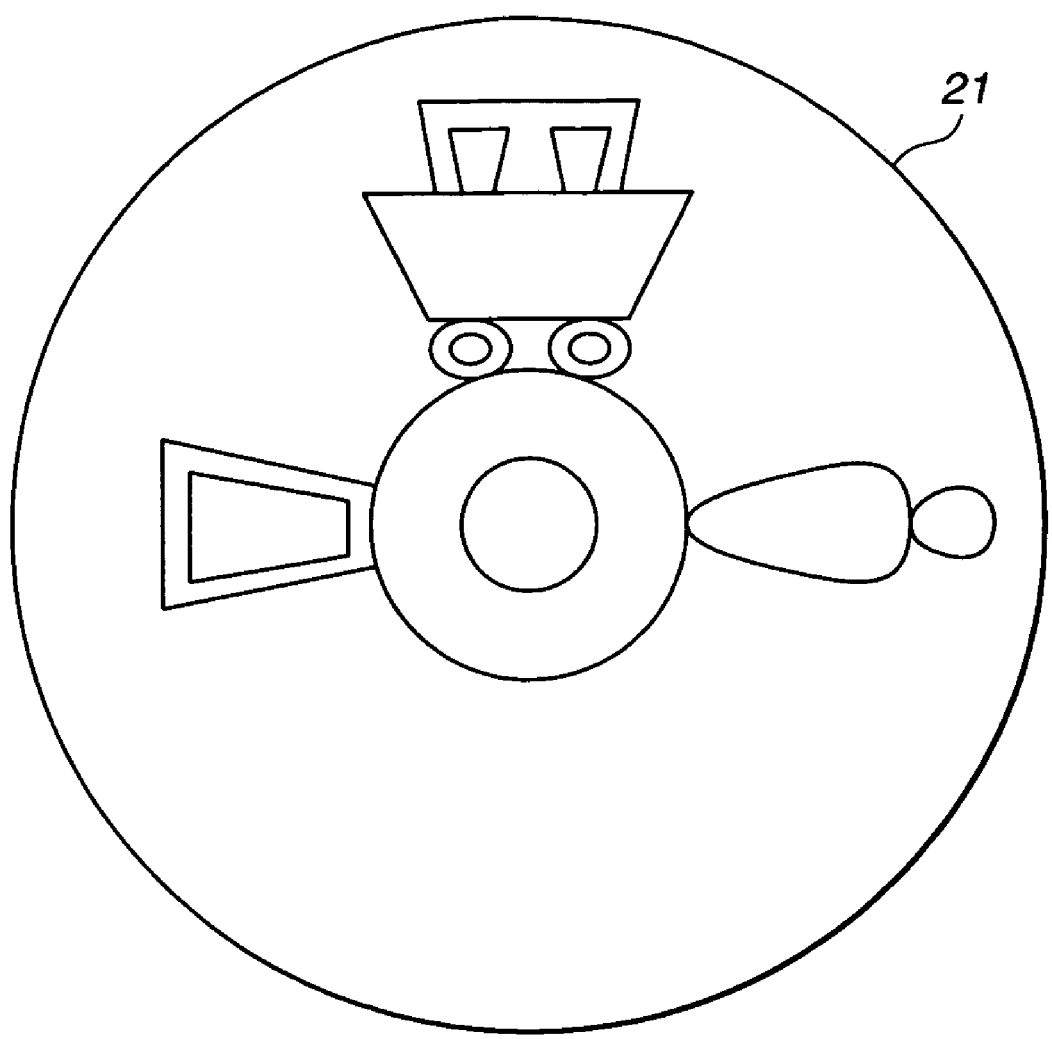
FIG. 3 is a view showing picture image that the image pick-up unit outputs.

The image pick-up unit 1 used in this picture providing system comprises, as shown in FIG. 2, a transparent cylindrical body 11 formed by transparent glass or plastic, and a mirror 12 and a video camera 13 are supported within this cylindrical body 11 so that they are respectively located at predetermined positions. The mirror 12 reflects light corresponding to image therearound from the external inputted through the transparent cylindrical body 11 to allow the video camera 13 to input it thereto. The video camera 13 picks up image therearound reflected by the mirror 12 to deliver, e.g., distorted picture image 21 shown in FIG. 3, for example, to the picture providing unit 2. Picture image that the video camera 13 picks up includes image of substantially 360 degrees at the periphery of the optical axis of the video camera 13.

Figure 4:
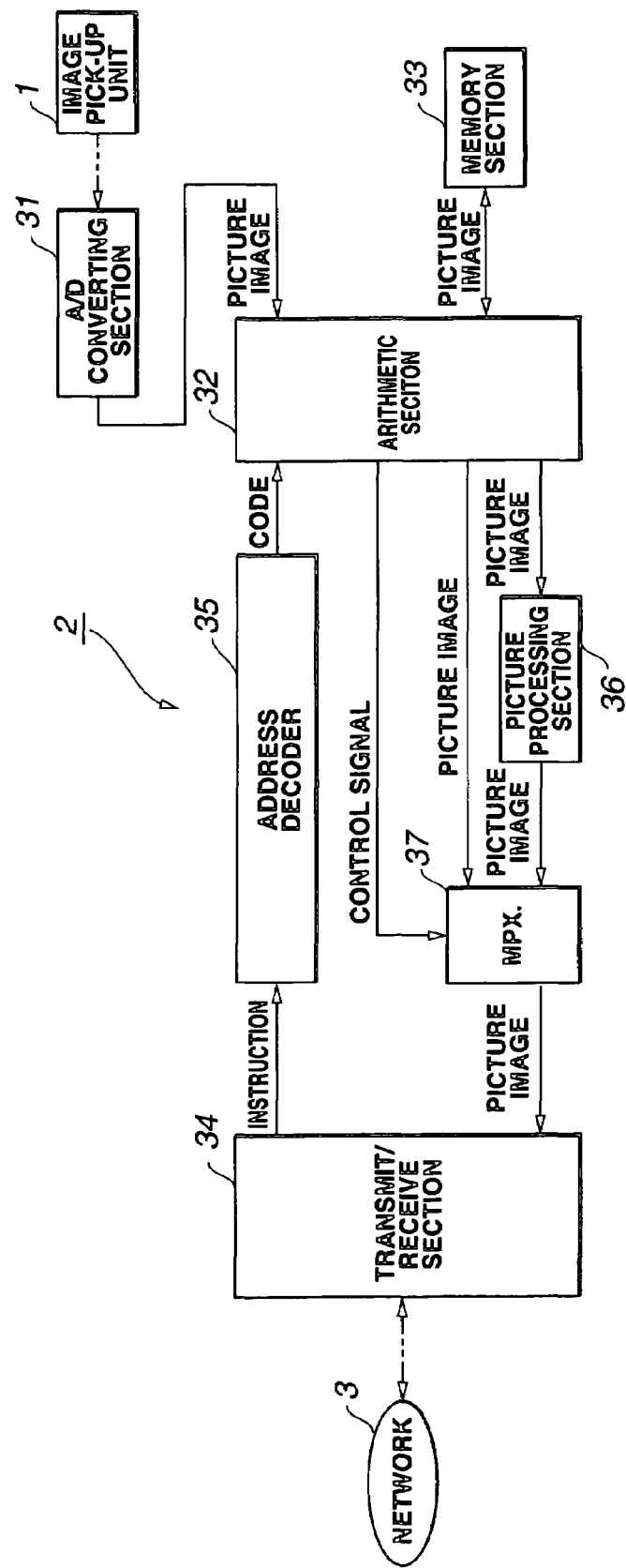
FIG. 4 is a block diagram showing a picture providing apparatus according to this invention used in the picture providing system.

The picture providing unit 2 constituting the picture providing system shown in FIG. 1 is constituted as shown in FIG. 4. This picture providing unit 2 comprises an A/D (Analog/Digital) converting section 31 supplied with picture signals from the image pick-up unit 1. The A/D converting section 31 carries out A/D conversion of deformed picture image inputted from the image pick-up unit 1 to output digital data corresponding to inputted picture image to an arithmetic section 32. The arithmetic section 32 allows a memory section 33 to store digital data of picture image inputted from the A/D converting section 31. The memory section 33 stores digital data based on picture image delivered from the arithmetic section 32, e.g., the picture image 21 shown in FIG. 3 to deliver, to the arithmetic section 32, digital data of picture image designated from the arithmetic section 32.

A transmit/receive section 34 receives instruction for making a request for transmission of picture image of a predetermined view point from the picture processing unit 4 or the monitor 7 through the network 3 to deliver it to an address decoder 35. The address decoder 35 converts instruction delivered from the transmit/receive section 34 into code for designating address of picture image that the memory section 33 stores to output it to the arithmetic section 32. The arithmetic section 32 inputs code for designating address of picture image delivered from the address decoder 35 to read out picture image corresponding to that code from the memory section 33 to deliver it to a multiplexer (MPX.) 37 or a picture processing section 36.

Figure 5:
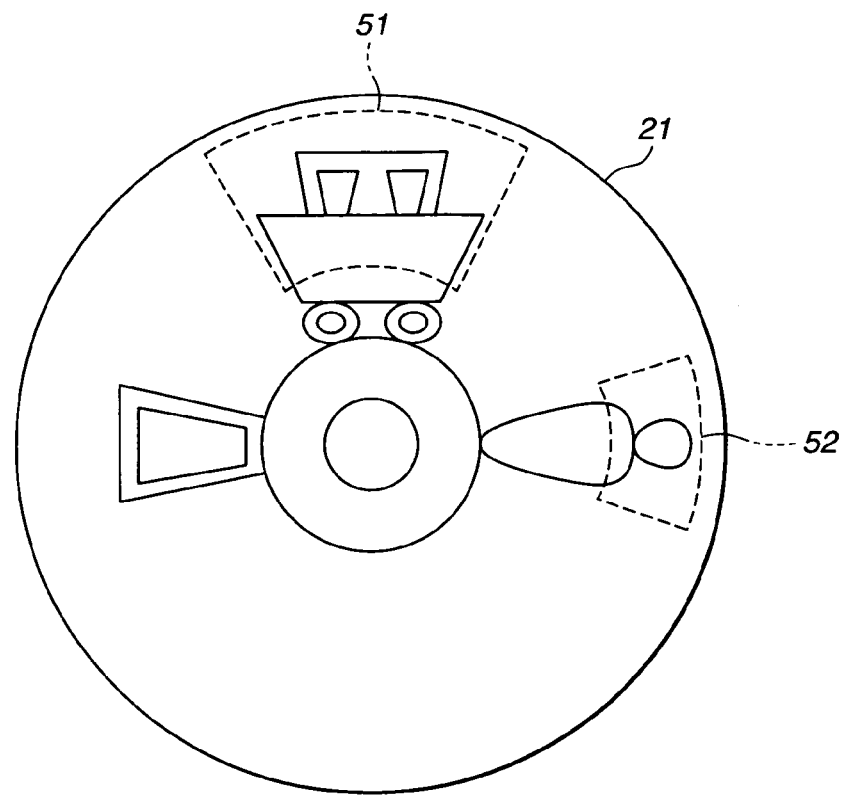
FIG. 5 is a view for explaining picture image which is read out from memory unit.
Figure 6:
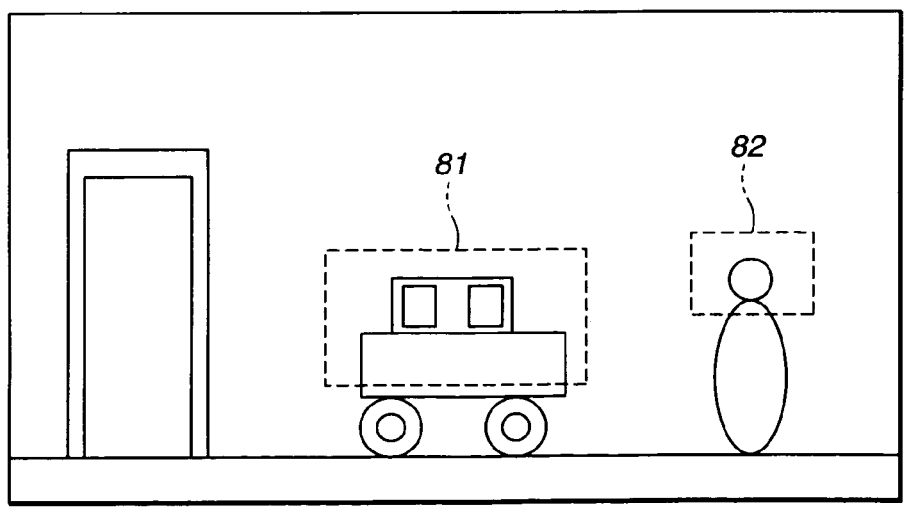
FIG. 6 is a view for explaining picture image obtained by converting picture image which has been read out from the memory unit.

For example, as shown in FIG. 5, a portion or the entirety of picture image 21 stored in the memory section 33 is specified by address of picture image delivered from the address decoder 35, and is read out from the memory section 33. For example, picture image 51 or picture image 52 is read out from the memory section 33, and is delivered to the multiplexer 37 or the picture processing section 36. The picture processing section 36 converts picture image delivered from the arithmetic section 32 into picture image having no distortion (distortion-free picture image) by classification adaptive processing to output it to the multiplexer 37. For example, picture image 51 of FIG. 5 is converted into picture image 81 of FIG. 6, and picture image 52 of FIG. 5 is converted into picture image 82 of FIG. 6.

The multiplexer 37 selects, on the basis of control signal delivered from the arithmetic section 32, picture image delivered from the arithmetic section 32 or picture image delivered from the picture processing section 36 to output selected picture image to the transmit/receive section 34. The transmit/receive section 34 transmits picture image inputted from the multiplexer 37 to the picture processing unit 4 or the monitor 7 which makes request for transmission of picture image.

Figure 7:
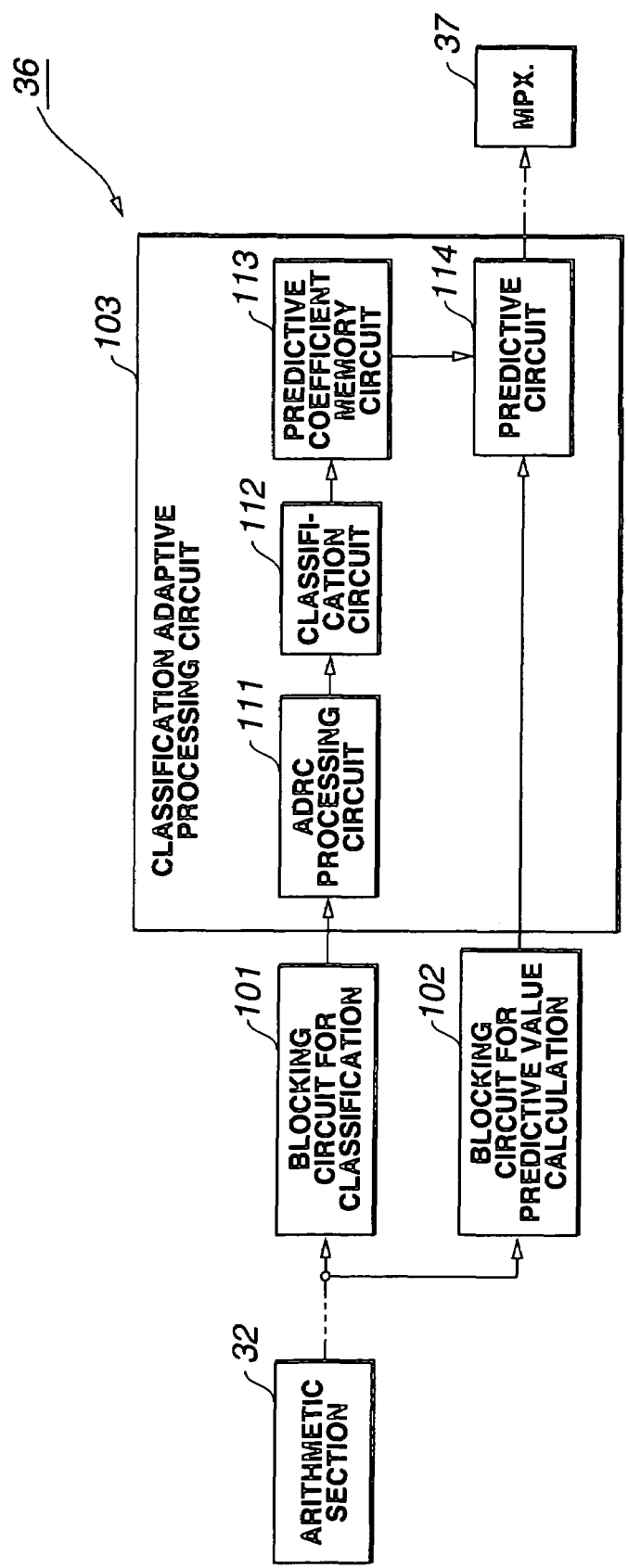
FIG. 7 is a block diagram showing the configuration of picture processing unit according to this invention used in the picture providing system.

Explanation will now be given in more detail in connection with the picture processing section 36 adapted for converting picture image delivered from the arithmetic section 32 into picture image having no distortion (distortion-free picture image) by the classification adaptive processing. FIG. 7 is a block diagram showing the configuration of the picture processing section 36. A blocking circuit 101 for classification blocks distorted picture image delivered from the arithmetic unit 32 into blocks for classification in which remarked pixel which is unit for carrying out classification into predetermined classes in accordance with its property is being as center.

Figure 8:
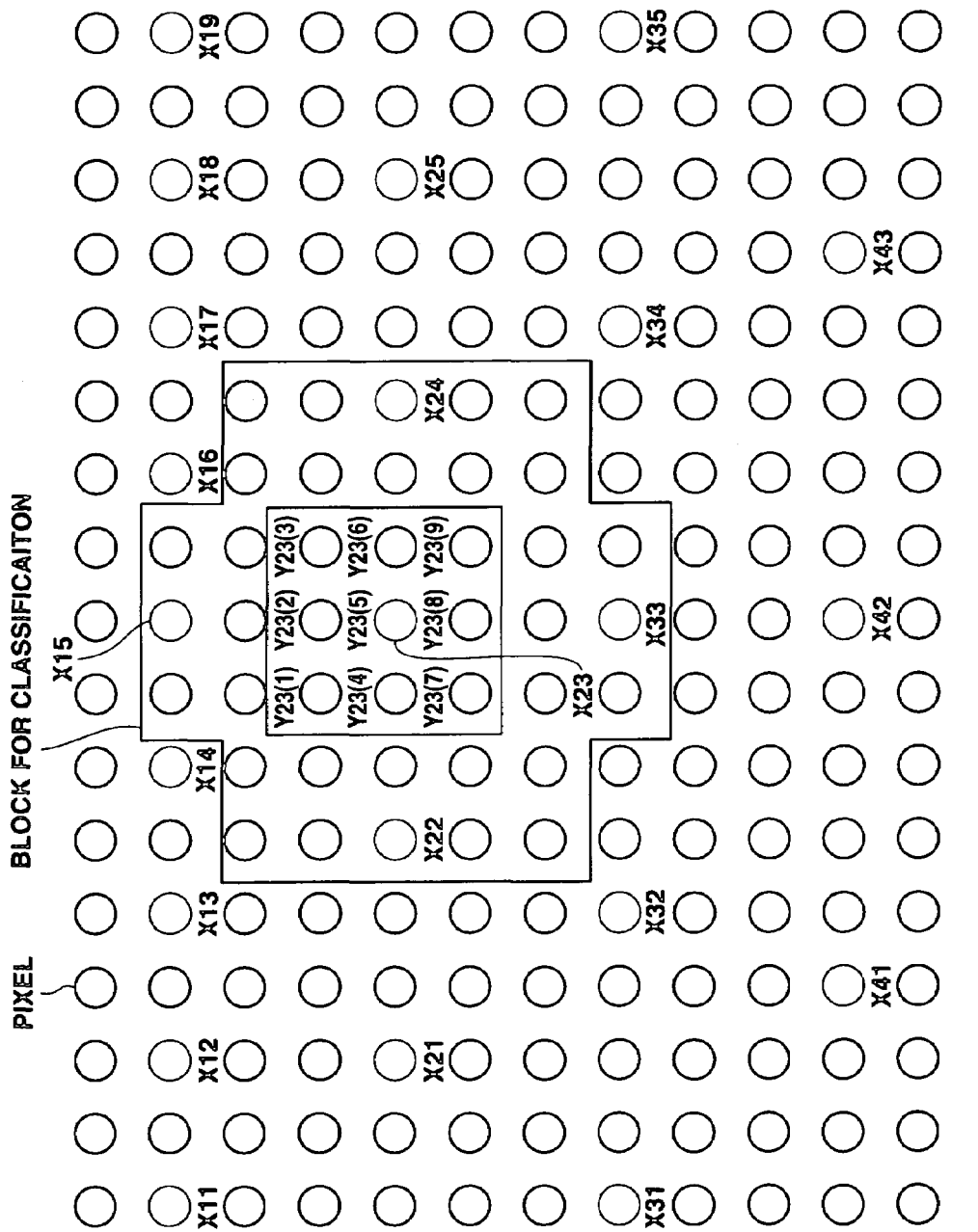
FIG. 8 is a view for explaining block for classification and block for predictive value calculation.

Namely, in FIG. 8, when it is assumed that pixel (portion indicated by black ○ mark in the Figure) which is located at i-th row from the top and j-th column from the left is represented as $X_{ij}$, the classification blocking circuit 101 constitutes classification blocks constituted by five pixels in total in which the own pixel $X_{ij}$ is added to four pixels $X_{(i-1)j}$, $X_{i(j-1)}$, $X_{i(j+1)}$, $X_{(i-1)j}$ adjacent to the top, left, right and bottom portions thereof. This classification block is delivered to a classification adaptive processing circuit 103.

In this case, the classification block is constituted by block consisting of pixels arranged in cross form. However, the shape of the classification block is not required to have cross shape. In addition thereto, e.g., rectangle, square or arbitrary shape may be employed. It is further noted that the number of pixels constituting classification block is not limited to five.

A blocking circuit 102 for predictive value calculation blocks pixels of picture image into blocks for predictive value calculation in which remarked pixel, which is unit for calculating predictive value having no distortion, is caused to be center. Namely, in FIG. 8, when pixel values of 9 pixels of 3×3 in picture image having no distortion in which pixel $X_{ij}$ (portion indicated by ○ mark in the figure) of picture image is caused to be center are respectively represented by $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$ in the right direction from the leftmost portion and in the lower direction from the uppermost portion, the predictive value calculation blocking circuit 102 constitutes square predictive value calculation blocks constituted by, e.g., 22 pixels ($X_{j-1)(j-2)}$, $X_{(i-1)(j-1)}$, $X_{(i-1)}$, $X_{(i-1)(j+1)}$, $X_{(i-1)(j+2)}$, $X_{(i-1)(j+3)}$, $X_{(i-1)(j+4)}$, $X_{(i-1)(j+5)}$, $X_{(i-1)(j+6)}$, $X_{(i-1)(j+7)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-1)}$, $X_{(i+2)j}$, $X_{(i+2)(j+1)}$ with the pixel $X_{ij}$ being as center for the purpose of calculation of predictive values of pixels $Y_{ij}(1)$ to $Y_{ij}(9)$.

In more practical sense, e.g., for the purpose of calculation of predictive values of pixels $Y_{23}(1)$ to $Y_{23}(9)$ having no distortion encircled by square in FIG. 8, the predictive value calculation block is constituted by $X_{11}$, $X_{12}$, $X_{13}$, $X_{14}$, $X_{15}$, $X_{16}$, $X_{17}$, $X_{18}$, $X_{19}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$.

The predictive value calculation block obtained at the predictive value calculation blocking circuit 102 is delivered to classification adaptive processing circuit 103.

Also with respect to predictive value calculation block, the number of pixels and the shape are not limited to the above-described ones similarly to the case in the classification block. It is to be noted that it is desirable that the number of pixels constituting the predictive value calculation block is greater than the number of pixels constituting the classification block.

In addition, there may change the number of pixels constituting the classification block and predictive value calculation block in dependency upon position of remarked picture image.

There are instances where, while in the case where there is carried out blocking as described above (similarly also with respect to processing except for blocking), corresponding pixel does not exist in the vicinity of picture frame of picture image. In this case, however, processing is carried out on the assumption that, e.g., the same pixels as pixels constituting picture frame exists at the outside thereof.

The classification adaptive processing circuit 103 is composed of an ADRC (Adaptive Dynamic Range Coding) processing circuit 111, a classification circuit 112, a predictive coefficient memory circuit 113 and a predictive circuit 114, and serves to carry out classification adaptive processing.

The ADRC processing circuit 111 implements ADRC processing to classification block from the classification blocking circuit 101 to deliver, to the classification circuit 112, block constituted with ADRC codes obtained as the result of ADRC processing.

In this case, in accordance with the ADRC processing of the ADRC processing circuit 111, the number of bits of pixels constituting classification block is recorded from 8 bits to 2 bits.

Figure 9A:
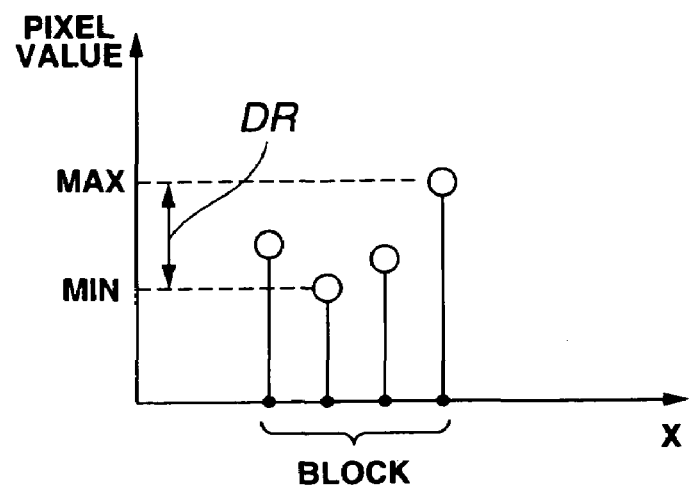
FIGS. 9A and 9B are views for explaining processing of ADRC.

Namely, e.g., for the purpose of simplifying the explanation, as shown in FIG. 9A, consideration is made with respect to block consisting of 4 pixels arranged on straight line. In the ADRC processing, maximum value MAX and minimum value MIN of corresponding pixel value are detected. Further, DR=MAX−MIN is assumed to be local dynamic range of block. On the basis of the dynamic range DR, pixel value of pixels constituting block is requantized into K bits.

Figure 9B:
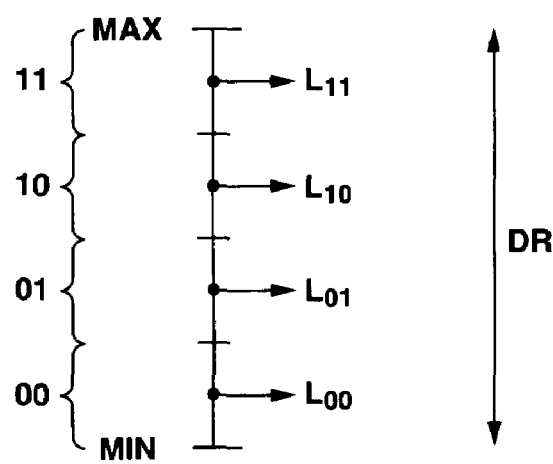

Namely, the minimum value MIN is subtracted from respective pixel values within block and the subtracted value is divided by $DR/2^K$. Further, code (ADRC code) corresponding to divided value obtained as the result thereof is provided by conversion. In more practical sense, e.g., K is assumed to be equal to 2. In this case, as shown in FIG. 9B, it is judged that the divided value belongs to any one of ranges obtained by equally dividing the dynamic range DR by $4(=2^2)$. In the case where the divided value belongs to the range of lowermost level, the range of the second level from the lowermost level, the range of the third level from the lowermost level and the range of the uppermost range, coding of 2 bits, e.g. 00B, 01B, 10B, 11B, etc. is provided (B indicates binary number). Further, on the decoding side, ADRC codes 00B, 01B, 10B, 11B are converted into center value $L_{00}$ of the range of the lowermost level, center value $L_{01}$ of the second level from the lowermost level, center value $L_{10}$ of the range of the third level from the lowermost level, and center value $L_{11}$ of the range of the uppermost level which are obtained by equally dividing the dynamic range DR by 4. The minimum value MIN is added to these values so that decoding is carried out.

Here, such an ADRC processing is called non-edge matching.

It is to be noted that the detail of the ADRC processing is disclosed in, e.g., the Japanese Application Laid Open No. 53778/1991 publication that the applicant of this application has already filed, etc.

In accordance with such an ADRC processing, requantization is carried out by the number of bits which is less than the number of bits assigned to pixels constituting block, thereby making it possible to reduce the number of bits.

Explanation will be briefly given in connection with the classification processing and the adaptive processing. The classification adaptive processing is a processing to classify input signal into several classes on the basis of the feature to implement adaptive processing suitable for those classes to input signal portions of respective classes, and is roughly classified into the classification processing and the adaptive processing.

First, the classification processing will be described.

Figure 10A:
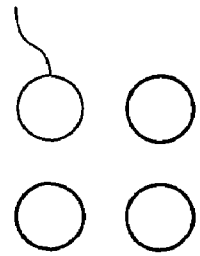
FIGS. 10A and 10B are views for explaining classification processing.
Figure 10B:
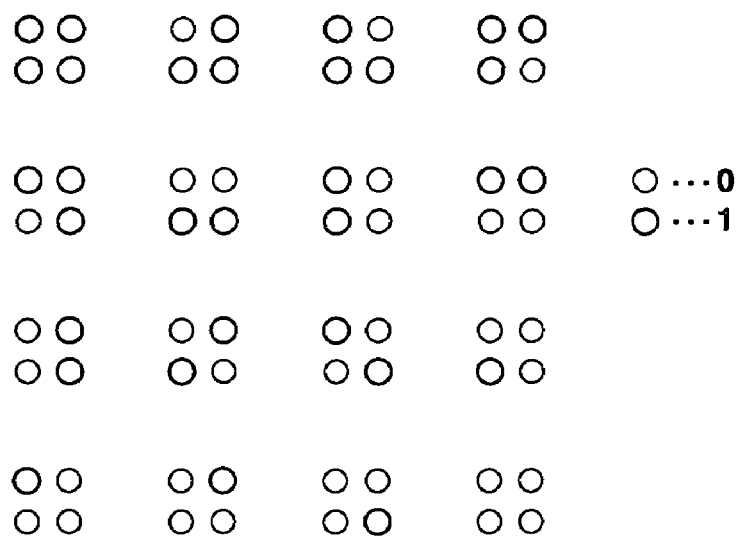

Now, for example, as shown in FIG. 10A, block (block for classification) consisting of 2×2 pixels is assumed to be constituted by remarked pixel and three pixels adjacent thereto, and each pixel is assumed to be represented by 1 bit (takes any one of 0 or 1 level). In this case, block of 4 pixels of 2×2 can be classified into 16 ($(2^1)^4$) patterns as shown in FIG. 10B by the level distribution of respective pixels. Such pattern classification is the classification processing and is carried out in the classification circuit 112.

It is to be noted that the classification processing may be carried out in view of activity (complexity of picture image), (violence of change) of picture image (picture image within block), etc.

In this example, ordinarily, e.g., about 8 bits are assigned to original pixel. Moreover, in this example, as described above, classification block consists of 5 pixels. Accordingly, when such classification block is constituted by original pixels of 8 bit to carry out classification processing, classification into vast quantity of $(2^8)^5$ is carried out.

On the other hand, in this example, in the ADRC processing circuit 111, the number of bits of pixels is reduced (reduced from 8 bits to 2 bits). Thus, the number of classes can be reduced ($1024\ (=(2^2)^5)$).

The classification circuit 112 executes classification processing on the basis of ADRC code delivered from the ADRC processing circuit 111 to output a signal for designating class to predictive coefficient memory circuit 113.

The adaptive processing will now be described.

In order to carry out adaptive processing, it is necessary to make in advance learning of predictive coefficients for predicting picture image having no distortion from distorted picture image by distorted picture image inputted by the image pick-up unit 1 and distortion-free picture image taken in by plural cameras, etc. to store them in the predictive coefficient memory circuit 113.

Figure 11:
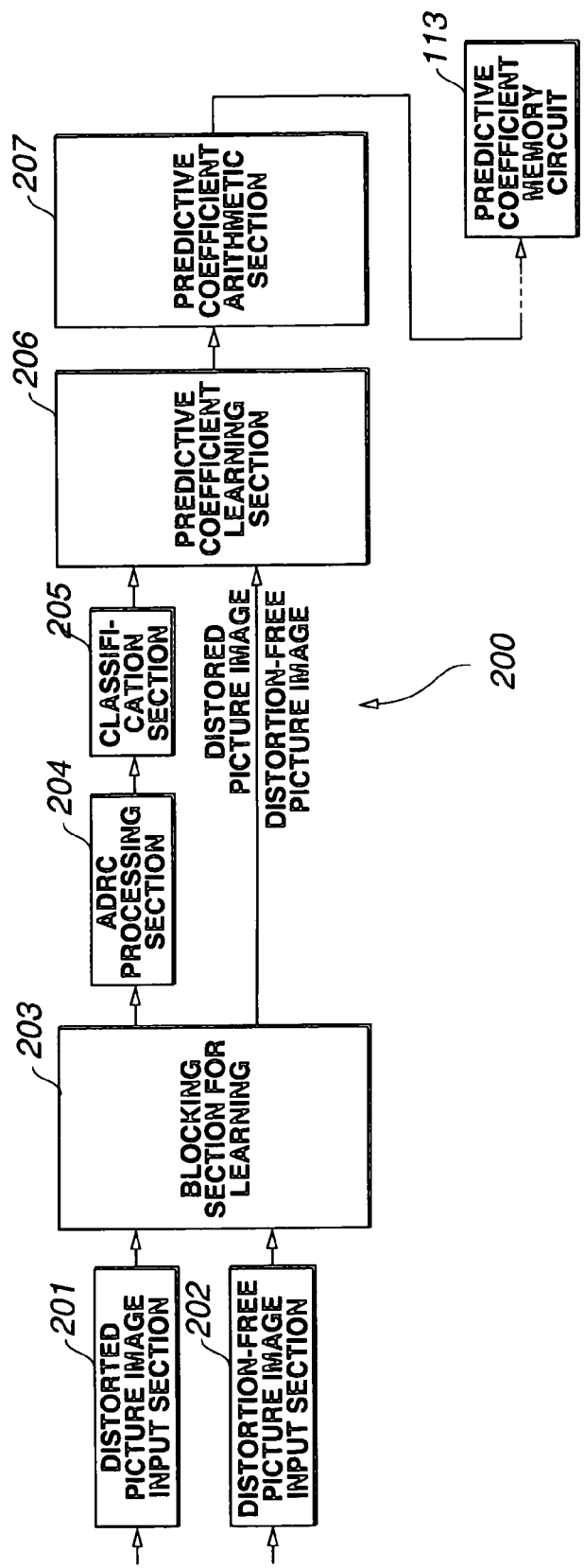
FIG. 11 is a block diagram showing learning unit according to this invention.

This adaptive processing will be explained by using a learning unit 200 shown in FIG. 11.

From a distorted picture image input section 201, distorted picture image inputted by the image pick-up unit 1 is inputted. Moreover, from a distortion-free picture input section 202, distortion-free picture image at substantially the same position as the position which is imaged by the image pick-up unit 1 is inputted. For example, the distortion-free picture input section 202 is plural cameras having less periphery distortion.

Then, picture images inputted from the distorted picture image input section 201 and distortion-free picture input section 202 are transferred to a blocking sections 203 for learning. The learning blocking section 203 generates picture blocks which are processing unit used for learning of predictive coefficients between distorted picture image and distortion-free picture image. In this case, the number of pixels of the distorted portion at the periphery of the distorted picture image is less as compared to corresponding number of pixels of distortion-free picture image. Thus, it is desirable to change picture image blocks for learning with respect to the portion in which picture image is not distorted and distorted portion of the distorted picture image. For example, it is desirable that there is set, with respect to the distorted portion, such a picture image block of broad range to include pixels of the portion away from the remarked pixel. In this connection, since prediction from picture block having lesser number of pixels to picture block having greater number of pixels is carried out at the stage of the adaptive processing, it is necessary to predict plural distortion-free pixel values by making use of the same distorted picture block. In view of the above, i.e., by respectively collecting picture blocks in which relative positions from remarked pixel are the same to learn predictive coefficients, it is possible to predict plural distortion-free pixel values from the same distorted picture block.

Distorted picture block extracted at the learning blocking section 203 is inputted to an ADRC processing section 204 and is classified into classes every distorted picture block at a classification section 205 on the basis of ADRC processing result. The ADRC processing section 204 and the classification section 205 are of the configurations similar to those of the above-described ADRC processing circuit 111 and the classification circuit 112, respectively.

Classification result of distorted picture block is inputted to a predictive coefficient learning section 206. Further, corresponding distorted picture block and distortion-free picture image serving as teacher of prediction are inputted to predictive coefficient learning section 206 through the learning blocking section.

The predictive coefficient learning section 206 will now be described in detail.

For example, here, let consider that predictive value E[y] of pixel value y of distortion-free picture image is determined by linear first-order combination model prescribed by linear combination of pixel values of pixels of distorted picture image (hereinafter referred to as learning data as occasion may demand) $x_1, x_2, \ldots$ and predetermined predictive coefficients $W_1, W_2, \ldots$. In this case, the predictive value E[y] can be represented by the following equation.

$$E[y]=w_1 x_1+w_2 x_2+\ldots+w_{25}x_{25} \tag{1}$$

Now, matrix W consisting of set of predictive coefficients w, matrix X consisting of set of learning data and matrix Y' consisting of set of predictive values E[y] are defined as follows.

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{12} & \cdots & x_{mn} \end{pmatrix} W = \begin{pmatrix} W_1 \\ W_2 \\ \cdots \\ W_n \end{pmatrix}, Y' = \begin{pmatrix} E[y_1] \\ E[y_2] \\ \cdots \\ E[y_n] \end{pmatrix}$$

Observation equation as described below holds.

$$XW=Y' \tag{2}$$

Thus, let's consider that the least square is applied to this observation equation to determine predictive value E[y] close to pixel value y of distortion-free picture image. In this case, matrix Y consisting of set of pixel values y of distortion-free picture image (hereinafter referred to as teacher data as occasion may demand), and matrix E consisting of set of residuals e of predictive value E[y] with respect to pixel value y of distortion-free picture image are defined as follows.

$$E = \begin{pmatrix} e_1 \\ e_2 \\ \cdots \\ e_m \end{pmatrix}, Y = \begin{pmatrix} y_1 \\ y_2 \\ \cdots \\ y_n \end{pmatrix}$$

Residual equation as described below holds from the equation (2).

$$XW=Y+E \tag{3}$$

In this case, predictive coefficient wi for determining predictive value E[y] close to pixel value y of distortion-free picture image can be determined by minimizing square error as described below.

$$\sum_{i=1}^{m} e_i^2$$

Accordingly, in the case where value obtained by differentiating the above-described square error by predictive coefficients wi, i.e., the predictive coefficient wi which satisfies the following equation results in optimum value for determining predictive value E[y] close to pixel value y of distortion-free picture image.

$$e_1 \frac{\partial e_1}{\partial w_i} + e_2 \frac{\partial e_2}{\partial w_i} + \cdots + e_m \frac{\partial e_m}{\partial w_i} = 0 (i = 1, 2, \cdots, n) \quad (4)$$

In view of the above, by differentiating the equation (3) by predictive coefficients wi, the following equation holds.

$$\frac{\partial e_i}{\partial w_i} = x_{i1}, \frac{\partial e_i}{\partial w_2} = x_{i2}, \cdots, \frac{\partial e_i}{\partial w_n} = x_{in}, (i = 1, 2, \cdots, m) \quad (5)$$

From the equations (4) and (5), the equation (6) is obtained.

$$\sum_{i=1}^{m} e_i x_{i1} = 0, \sum_{i=1}^{m} e_i x_{i2} = 0, \cdots \sum_{i=1}^{m} e_i x_{in} = 0 \quad (6)$$

Further, when the relationship of learning data x, predictive coefficient w, teacher data y and residual e in the residual equation of the equation (3) is taken into consideration, normal equations as described below can be obtained.

$$\begin{cases} \left(\sum_{i=1}^{m} x_{i1}x_{i1}\right)w_1 + \left(\sum_{i=1}^{m} x_{i1}x_{i2}\right)w_2 + \cdots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \cdots + \left(\sum_{i=1}^{m} x_{i2}x_{in}\right)w_n = \left(\sum_{i=1}^{m} x_{i2}y_i\right) \\ \cdots \\ \left(\sum_{i=1}^{m} x_{in}x_{i1}\right)w_1 + \left(\sum_{i=1}^{m} x_{in}x_{i2}\right)w_2 + \cdots + \left(\sum_{i=1}^{m} x_{in}x_{in}\right)w_n = \left(\sum_{i=1}^{m} x_{iy}y_i\right) \end{cases} \quad (7)$$

The normal equations of the equation (7) can be formed by the same number as the number of predictive coefficient w to be determined.

Then, the above-described normal equations are transferred to a predictive coefficient arithmetic (computing) section 207. The predictive coefficient arithmetic section 207 can determine optimum predictive coefficient w by solving the equation (7). In solving the equation (7), e.g., sweep-out method (method of elimination of Gauss-Jordan), etc. can be applied.

In a manner stated above, optimum coefficients w are determined every classes, and predictive coefficients are transferred to a predictive coefficient memory circuit 113.

Namely, the adaptive processing is processing in which predictive coefficients w obtained by learning stored in the predictive coefficient memory circuit 113 are used to determine predictive value E[y] close to pixel value y of distortion-free picture image from distorted picture image.

The predictive coefficient memory circuit 113 shown in FIG. 7 stores in advance optimum predictive coefficients w every classes as described above. The predictive coefficient memory circuit 113 outputs, to predictive circuit 114, optimum predictive coefficients w every classes on the basis of signal for designating class delivered from classification circuit 112. The predictive circuit 114 executes adaptive processing on the basis of optimum predictive coefficient w delivered from the predictive coefficient memory circuit 113 to output pixel value y of distortion-free picture image to the multiplexer (MPX.) 37.

It is to be noted that the adaptive processing differs from interpolation processing in that there are reproduced components included in distortion-free picture image which are not included in distorted picture image. Namely, when only the equation (1) is viewed, the adaptive processing is similar to interpolation processing using so-called interpolation filter, but predictive coefficients w corresponding to tap coefficients of that interpolation filter are determined by the so-called learning using teacher data y. For this reason, components included in distortion-free picture can be reproduced. From this fact, it can be said that the adaptive processing is processing having the so-called creative action of picture image.

Figure 12:
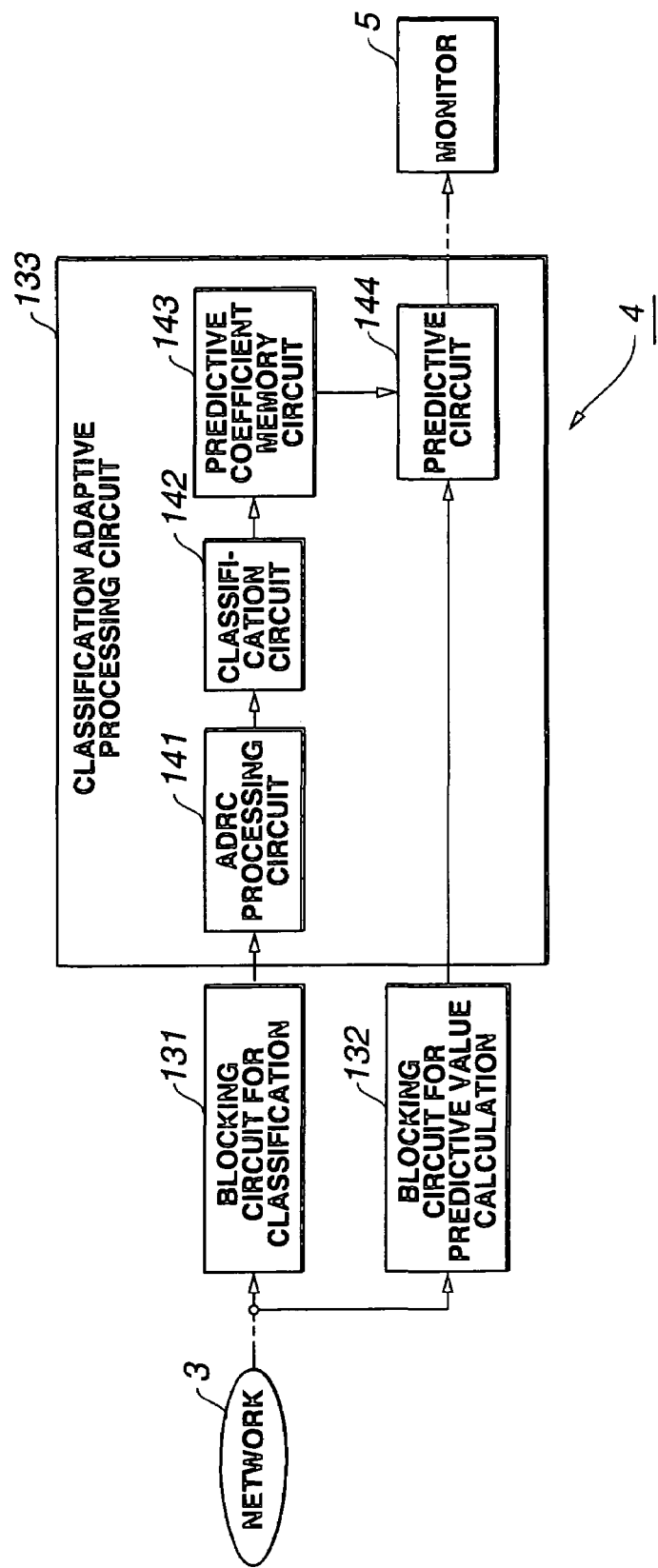
FIG. 12 is a block diagram showing picture processing unit.

FIG. 12 is a block diagram for explaining the configuration of the function of the picture processing unit 4 when distorted picture image that the picture processing unit 4 receives from the picture providing unit 2 is converted into picture image having no distortion. A blocking circuit 131 for classification blocks pixels of distorted picture image received from the picture providing unit 2 through the network 3 into blocks for classification to deliver them to a classification adaptive processing circuit 133. A blocking circuit 132 for predictive value calculation blocks pixels of distorted picture image received from the picture processing unit 2 through the network 3 into blocks for predictive value calculation to deliver them to the classification adaptive processing circuit 133.

The classification adaptive processing circuit 133 is composed of an ADRC processing circuit 141, a classification circuit 142, a predictive coefficient memory circuit 143, and a predictive circuit 144, and serves to execute classification adaptive processing on the basis of classification block delivered from the classification blocking circuit 131 and predictive value calculation block delivered from the predictive value calculation blocking circuit 132 to create distortion-free picture image to output it to the monitor 5.

The ADRC processing circuit 141 implements ADRC processing to classification blocks from the classification blocking circuit 131 to deliver blocks constituted by ADRC codes obtained as the result thereof to the classification circuit 142. The classification circuit 142 executes classification processing on the basis of ADRC codes delivered from the ADRC processing circuit 141 to output a signal for designating class to the predictive coefficient memory circuit 143. The predictive coefficient memory circuit 143 stores in advance optimum predictive coefficients w every classes to output, to the predictive circuit 144, optimum predictive coefficients w every classes on the basis of signal which designates class delivered from the classification circuit 142. The predictive circuit 144 executes adaptive processing on the basis of optimum predictive coefficient w delivered from the predictive coefficient memory circuit 143 and predictive value calculation block delivered from the predictive value calculation blocking circuit 132 to output pixel value y of distortion-free picture image to the monitor 5.

Figure 13:
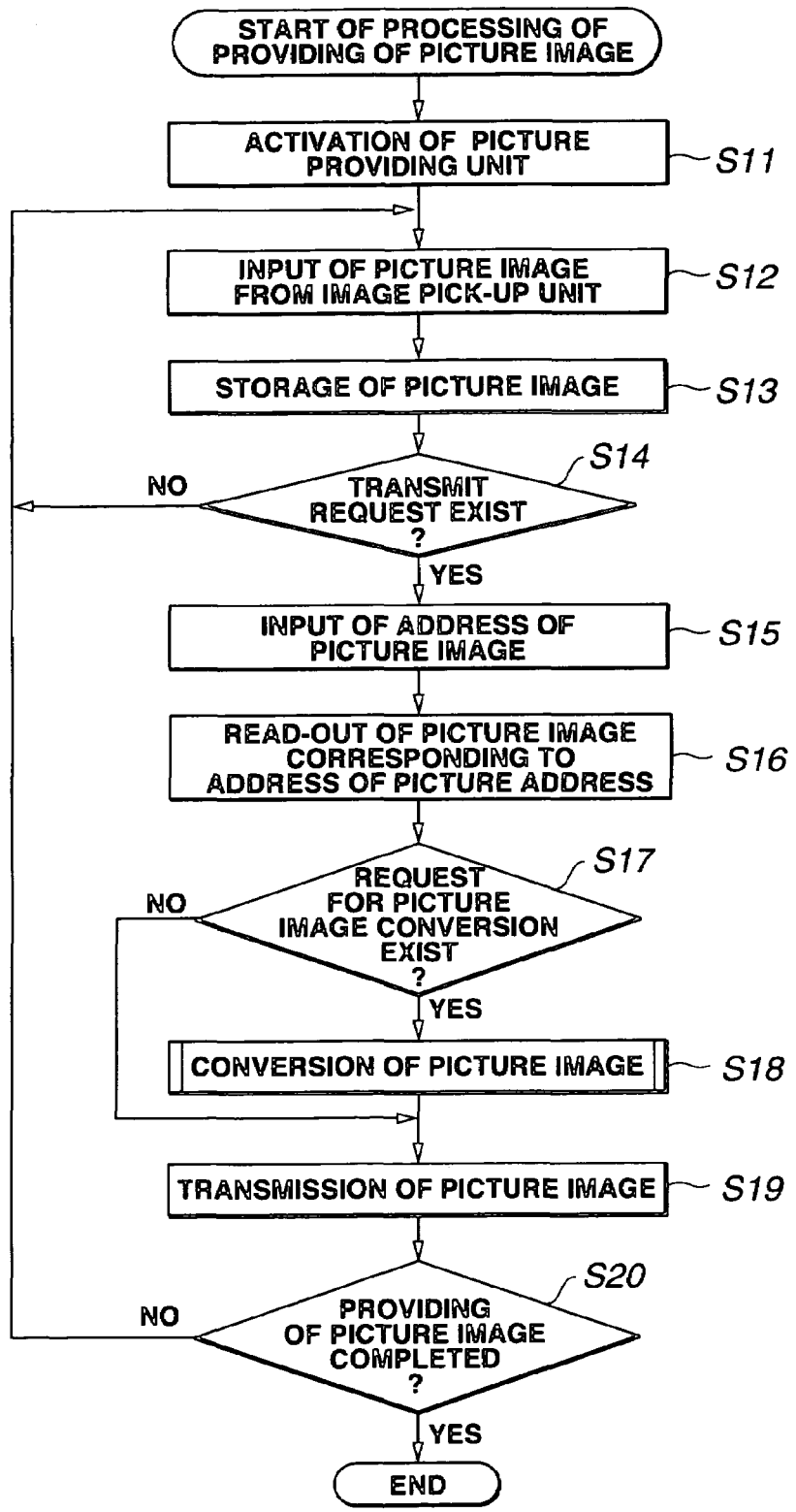
FIG. 13 is a flowchart for explaining processing which provides picture image of the picture providing unit.

The processing for providing picture image of the picture providing unit 2 will now be described with reference to the flowchart of FIG. 13. At step S11, manager of the picture providing unit 2 starts (activates) the picture providing unit 2. At step S12, an A/D conversion section 31 of the picture providing unit 2 carries out A/D conversion of picture image delivered from the image pick-up unit 1 to generate digital data corresponding to inputted picture image to deliver it to the arithmetic section 32. At step S13, the arithmetic section 32 of the picture providing unit 2 allows the memory section 33 to store digital data inputted from the A/D conversion section 31.

At step S14, transmit/receive section 34 receives transmission request for picture image delivered from the picture processing unit 4 or the monitor 7 through the network 3 to deliver it to address decoder 35. The address decoder 35 converts transmission request for picture image delivered from the transmit/receive section 34 into code which designates address of picture image to output it to the arithmetic section 32. The arithmetic section 32 judges, on the basis of signal delivered from the address decoder 35, whether or not request for transmission exists. In the case where it is judged that request for transmission exists, the processing proceeds to step S15 to input code which designates address of picture image delivered from the address decoder 35. At step S16, the arithmetic section 32 reads out a predetermined picture image from the memory section 33 on the basis of code which designates address of picture image.

At step S17, the arithmetic section 32 judges, on the basis of signal delivered from the address decoder 35, i.e., signal corresponding to transmission request of picture image delivered from the picture processing unit 4 or the monitor 7, whether or not request for picture image conversion exists. As a result, in the case where it is judged that request for picture image conversion exists, the processing proceeds to step S18 to output, to the picture processing section 36, a predetermined picture image which has been read out from the memory section 33 to allow the picture processing section 36 to convert it into distortion-free picture image to allow the multiplexer 37 to output the distortion-free picture image to the transmit/receive section 34. At the step S17, in the case where it is judged that request for picture image conversion does not exist, conversion into distortion-free picture image is executed at the picture processing unit 4. Accordingly, the step S18 is skipped, and the arithmetic section 32 outputs, to the multiplexer 37, a predetermined picture image which has been read out from the memory section 33 as it is. Thus, the multiplexer 37 is caused to output the distorted picture image to the transmit/receive section 34.

At step S19, the transmit/receive section 34 transmits, to the picture processing unit 4 or the monitor 7 which has outputted transmission request for picture image is outputted at the step S14, the picture image delivered from the multiplexer 37 through the network 3. At step S20, the arithmetic section 32 judges, on the basis of signal from input section (not shown), whether or not providing of picture image is completed. As a result, in the case where it is judged that providing of picture image is not completed, the processing returns to the step S12 to repeat processing of providing of picture image. At the step S20, in the case where it is judged that providing of picture image is completed, the processing is completed.

At the step S14, in the case where it is judged that there is no request for transmission, the procedure returns to the step S12. Thus, processing is repeated from input of picture image delivered from the image pick-up unit 1.

As described above, the picture providing unit 2 provides a predetermined picture image with respect to the picture processing unit 4 or the monitor 7 on the basis of request from the picture processing unit 4 or the monitor 7. In the case where the picture processing unit 4 and the monitor 7 request different picture images at the same time, the picture providing unit 2 transmits predetermined pictures images at the same time.

Figure 14:
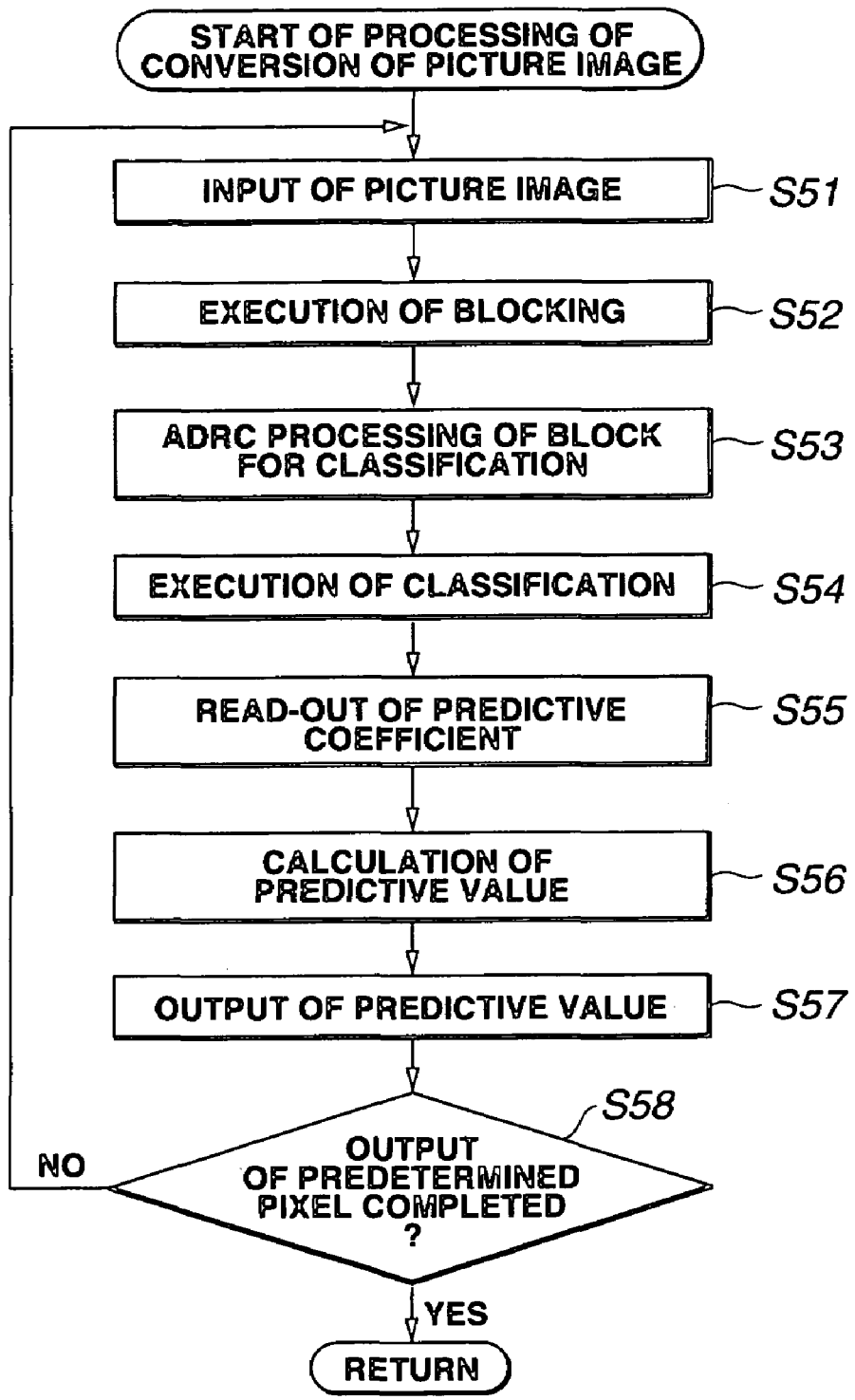
FIG. 14 is a flowchart for explaining processing of conversion of picture image of the picture processing unit.

The processing of conversion of picture image of the picture processing section 36 corresponding to the step S18 of FIG. 13 will now be described with reference to the flowchart of FIG. 14. At step S51, the picture processing unit 36 inputs a predetermined picture image from the arithmetic section 32. At step S52, the classification blocking circuit 101 blocks distorted picture image into classification blocks in which remarked pixel is caused to be center. The predictive value calculation blocking circuit 102 blocks distorted picture image into predictive value calculation blocks in which remarked pixel is caused to be center.

At step S53, the ADRC processing circuit 111 generates ADRC code of 2 bits corresponding to pixel value of pixels of classification block by ADRC processing on the basis of classification block delivered from the classification blocking circuit 101. At step S54, the classification circuit 112 carries out classification on the basis of ADRC code delivered from the ADRC processing circuit 111 to output a signal for designating class to the predictive coefficient memory circuit 113.

At step S55, the predictive coefficient memory circuit 113 outputs, to predictive circuit 114, optimum predictive coefficients w every classes corresponding to signals which designate classes. At step S56, the predictive circuit 114 calculates pixel value of remarked pixel on the basis of optimum predictive coefficient w delivered from the predictive coefficient memory circuit 113 and predictive value calculation block delivered from the predictive value calculation blocking circuit 102.

At step S57, the predictive circuit 114 outputs, to the multiplexer 37, pixel value of pixels of distortion-free picture image calculated at the step S56. At step S58, the predictive circuit 58 judges whether or not pixel value of pixels of a predetermined picture image is outputted. As a result, in the case where it is judged that pixel value of pixels of a predetermined picture image is not outputted, the processing procedure returns to the step S51 to repeat processing of conversion of picture image. At step S58, in the case where it is judged that pixel value of pixels of the predetermined picture image has been outputted, the processing procedure is completed.

As stated above, the picture processing section 36 generates distortion-free picture image by the classification adaptive processing from picture image delivered from the arithmetic section 32.

It should be noted that processing that the picture processing unit 4 carries out when the picture providing unit 2 transmits as it is, to the picture processing unit 4, a portion of picture image that the image pick-up unit 1 has imaged is similar to the processing which has been explained with reference to the flowchart of FIG. 14.

As stated above, the picture providing system of this invention can provide picture images at different positions or angles of visual field on the real time basis with respect to plural users. Accordingly, in the case where such system is utilized in the field of security, dead angle of camera is reduced and security is thus enhanced. In the case where such system is utilized in the field of advertisement, information guide or real estate, many users can view at the same time and at arbitrary position or angle of visual field of picture image such as actual goods or the inside of building, etc. Accordingly, quantity of information to be provided is increased. Thus, advertising effect is enhanced.

Further, in the field of the remote medical service of which study is being put into practical use, in the case where plural physicians distributed at different places organize team to carry out operation, respective plural physicians can view, at the same time, picture images at the portions that they desire to confirm. Accordingly, respective physicians can carry out precise judgment in a short time. Thus, burden on patient is lessened.

Since the image pick-up unit 1 has no mechanical operating portion, it is sufficient that interval of maintenance is long and the image pick-up unit 1 is less out of order.

It is to be noted that while it is described that the image pick-up unit 1 picks up moving picture to output it to the picture providing unit 2, the image pick-up unit 1 may pick up still picture to output it to the picture providing unit 2 and the picture providing unit 2 may provide still picture with respect to the picture processing unit 4 or the monitor 7.

In addition, the image pick-up unit 1 may be also caused to be of configuration utilizing one fisheye lens or more.

The system disclosed here represents the entirety of the apparatus constituted by plural units.

Further, the above-described series of processing may be carried out by hardware, or may be carried out by software. In the case where a series of processing are carried out by software, program constituting that software is installed into widely used computer, etc.

Figure 15:
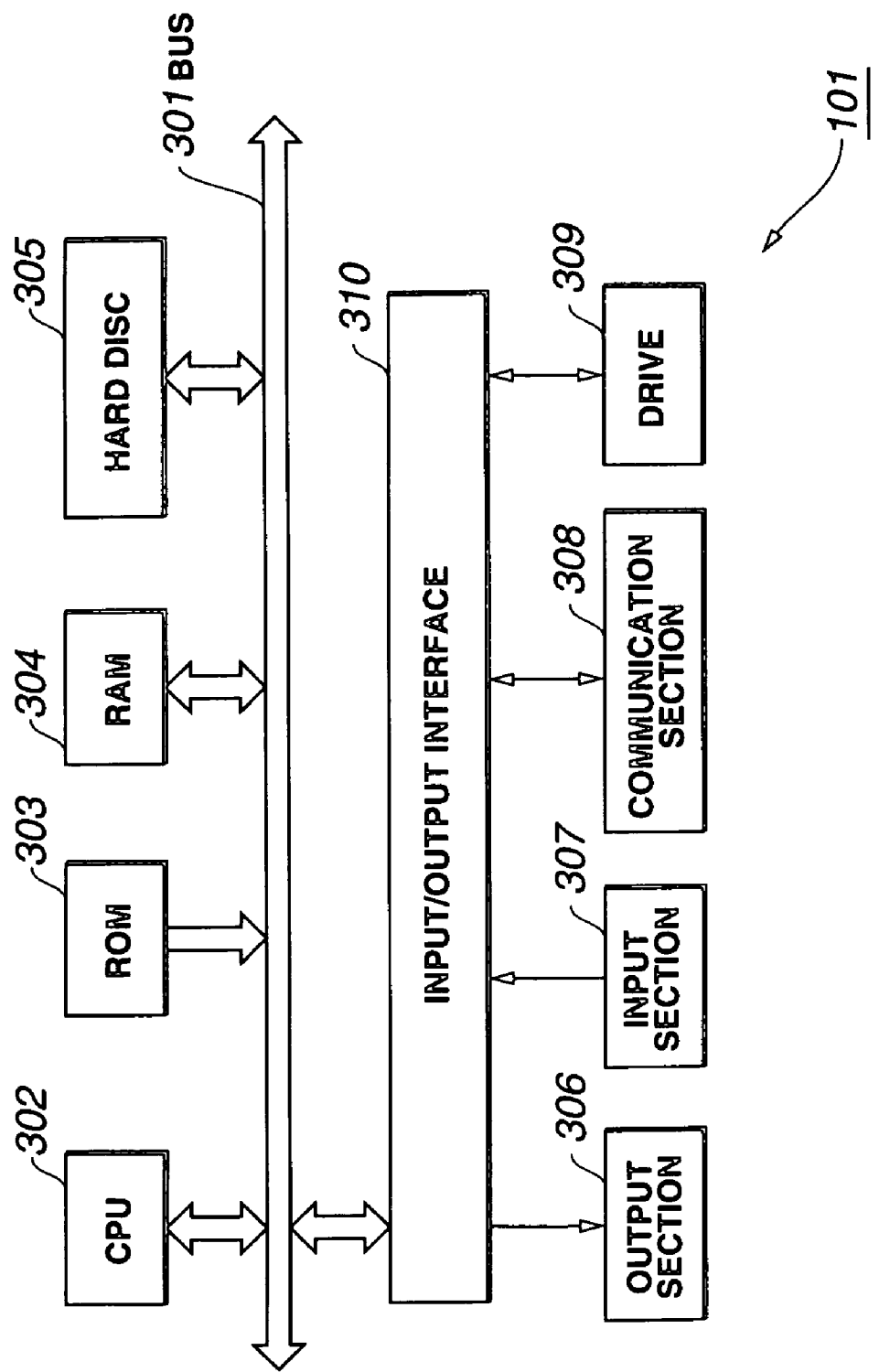
FIG. 15 is a block diagram showing the configuration of computer into which program for executing a series of processing of the picture providing system is installed.

Thus, FIG. 15 shows an example of computer into which program for executing the above-described series of processing is installed. Program used here may be recorded in advance with respect to a hard disc 305 or a ROM 303 as recording medium included within the computer. Alternatively, program may be temporarily or permanently stored (recorded) with respect to removable recording medium such as floppy disc, CD-ROM (Compact Disc Read Only Memory), MO (Magneto Optical) disc, DVD (Digital Versatile Disc), magnetic disc, semiconductor memory, magnetic memory, or optical memory, etc. Such a removable recording medium can be provided as the so-called package software.

It is to be noted that, in addition to installing program from removal recording media as described above into computer, program may be transferred to computer by radio transmission (wireless system) through artificial satellite for digital satellite broadcast from down load site, or may be transferred to computer by wire through network such as internet, and computer may receive program transferred in such a manner by a communication section 308 to install such program onto the hard disc 305 included therewithin.

The computer includes therewithin a CPU (Central Processing Unit) 302. An input/output interface 310 is connected to the CPU 302 through a bus 301. When command is inputted to the CPU 302 as the result of the fact that an input section 307 constituted with keyboard and/or mouse, etc. is operated by user through an input/output interface 310, the CPU 302 executes program stored in the ROM (Read Only Memory) 303 in accordance with such a command. Alternatively, the CPU 302 loads, into a RAM (Random Access Memory) 304, program stored on the hard disc 305, program transferred from satellite or network, received by the communication section 308 and installed on hard disc 305, or program installed on the hard disc 305 which has been read out from removable recording medium attached to a drive 309 to execute such program. Thus, the CPU 302 carries out processing in accordance with the above-described flowchart, or processing carried out by the configuration of the above-described block diagram. Further, e.g., the CPU 302 outputs its processing result from an output section 306 comprised of LCD (Liquid Crystal Display) or speaker, etc. through the input/output interface 310, transmits it from the communication section 308, and/or record it onto the hard disc 305, etc. as occasion demand.

It is here noted that while it is not necessarily required to process processing steps for describing program for allowing computer to carry out various processing in a time series manner along the sequence described as flowchart, such processing may include processing executed in parallel or individually, e.g., parallel processing or processing by object.

Further, program may be processed by one computer, or may be processed in a distributed manner by plural computers. In addition, program may be transferred to computer at remote place, at which it is executed.

INDUSTRIAL APPLICABILITY

In this invention, since learning is carried out between distorted picture image and distortion-free high quality picture, distorted picture image is corrected so that there results distortion-free picture image and is collectively converted into high quality picture image. Thus, resolution of distorted picture image can be converted into resolution similar to the portion free from distortion. Since conversion can be made by only predictive operation without a processing to carry out interpolation after coordinate transformation (conversion), it does not take much time in operation. In addition, unlike interpolation conventionally used, predictive operation is carried out on the basis of learning between distorted picture image and distortion-free picture image. Accordingly, this system is equivalent to creation of pixels which do not exist. Thus, picture image of higher resolution can be obtained.

The invention claimed is:

1. A picture providing apparatus adapted to input distorted picture image in which a predetermined range is collectively imaged from an image pick-up unit to provide the entirety or a portion of the picture image in accordance with request of a picture image display unit, the apparatus including:
   a communication unit configured to receive a request for transmission of picture image from the picture image display unit and to transmit the entirety or the portion of the picture image from which distortion has been eliminated to the picture image display unit;
   a memory unit configured to store the picture image inputted from the image pick-up unit;
   selector unit configured to select the entirety or the portion of the picture image stored in the memory unit in correspondence with the request that the communication unit has received; and
   picture image conversion unit configured to both eliminate distortion of the selected entirety or the portion of the picture image and convert the selected entirety or portion into high quality picture image with increased resolution in a single step,
   wherein the picture image conversion unit eliminates distortion of the entirety or a portion of the picture image selected by the selector unit and converts such picture image into high quality picture image with increased resolution by an adaptive processing in a classification adaptive processing.

2. The picture providing apparatus as set forth in claim 1, wherein the picture image conversion unit reduces a number of bits of pixel value of pixels of a block or blocks for classification by ADRC processing.

3. The picture providing apparatus as set forth in claim 1, wherein the high quality picture image has a resolution higher than that before the converting.

4. A picture providing method for a picture providing apparatus adapted to input distorted picture image in which a predetermined range is collectively imaged from an image pick-up unit to provide the entirety or a portion of the picture image in accordance with request of a picture display unit, the method including:

a communication step of receiving request for transmission of picture image from the picture image display unit and of transmitting the entirety or the portion of the picture image from which distortion is eliminated;

a memory step of storing the picture image inputted from the image pick-up unit;

a selection step of selecting the entirety or the portion of the picture image stored at the memory step in correspondence with the request received at the communication step; and a picture image conversion step of both eliminating distortion of the selected entirety or the portion of the picture image and of converting the selected entirety or portion into high quality picture image with increased resolution in a single step, wherein the picture image conversion step eliminates distortion of the entirety or a portion of the picture image selected by the selection step and converts such picture image into high quality picture image with increased resolution by an adaptive processing in a classification adaptive processing.

5. A computer-readable medium having recorded thereon a program that, when executed on a computer, causes the computer to perform the method comprising:

a communication step of inputting distorted picture image in which a predetermined range is collectively imaged from an image pick-up unit to receive request for transmission of picture image from a picture image display unit to a picture providing unit for providing an entirety or a portion of the picture image in accordance with request of the picture image display unit, and of transmitting the entirety or the portion of the picture image from which distortion is removed to the picture image display unit;

a memory step of storing the picture image inputted from the image pick-up unit;

a selection step of selecting the entirety or the portion of the picture image stored at the memory step in correspondence with the request received at the communication step; and a picture image conversion step of both eliminating distortion of the selected entirety or the portion of the picture image and of converting the selected entirety or portion into high quality picture image with increased resolution in a single step, wherein the picture image conversion step eliminates distortion of the entirety or a portion of the picture image selected by the selection step and converts such picture image into high quality picture image with increased resolution by an adaptive processing in a classification adaptive processing.

6. A picture processing apparatus comprising:

an extraction unit configured to extract a feature quantity every predetermined unit of picture data having distortion;

a classification unit configured to carry out classification on every predetermined unit of the picture data in accordance with the feature quantity extracted by the extraction unit; and a picture image conversion unit configured to both correct the distortion of the picture data in accordance with result of the classification and to convert the picture data into high quality picture image with increased resolution in a single step, wherein the picture image conversion unit eliminates distortion of the entirety or a portion of the picture image and converts such picture image into high quality picture image with increased resolution by an adaptive processing in a classification adaptive processing.

7. The picture processing apparatus as set forth in claim 6, which further comprises an image pick-up unit configured to image the picture data having distortion.

8. The picture processing apparatus as set forth in claim 6, wherein the picture image conversion unit eliminates distortion of the picture image having distortion by classification adaptive processing and converts it into high quality picture image.

9. The picture processing apparatus as set forth in claim 6, wherein the classification unit reduces the number of bits of pixel value of pixels of a block for classification by the ADRC processing.

10. A picture processing method including:

an extraction step of extracting feature quantity every predetermined unit of picture data having distortion;

a classification step of carrying out classification every predetermined unit of the picture data in accordance with feature quantity extracted by the extraction step; and a picture image conversion step of both correcting the distortion of the picture data in accordance with result of the classification and of converting the picture data into high quality picture image with increased resolution in a single step, wherein the picture image conversion step eliminates distortion of the entirety or a portion of the picture image and converts such picture image into high quality picture image with increased resolution by an adaptive processing in a classification adaptive processing.

11. A computer-readable medium having recorded thereon a program that, when executed on a computer, causes the computer to perform the method comprising:

an extraction step of extracting feature quantity every predetermined unit of picture data having distortion;

a classification step of carrying out classification every predetermined unit of the picture data in accordance with the feature quantity extracted by the extraction step; and a picture image conversion step of both correcting the distortion of the picture data in accordance with result of the classification step and of converting the picture data into high quality picture image with increased resolution in a single step, wherein the picture image conversion step eliminates distortion of the entirety or a portion of the picture image and converts such picture image into high quality picture image with increased resolution by an adaptive processing in a classification adaptive processing.

12. A picture providing system comprising an image pick-up unit, a picture providing unit, and a picture display unit, wherein the image pick-up unit includes image pick-up unit configured to collectively image picture image of a predetermined range, wherein the picture providing unit includes:

a first communication unit configured to receive a request for transmission of picture image from the picture display unit and to transmit, to the picture display unit, the entirety or a portion of the picture image from which distortion has been eliminated so that there is provided high quality picture image;

a memory unit configured to store the picture image inputted from the image pick-up unit;

a selector unit configured to select the entirety or a portion of the picture image that the memory unit stores in correspondence with the request that the first communication unit has received;

a classification unit configured to carry out classification on every predetermined unit of the picture data; and a picture image conversion unit configured to both correct the distortion of the picture data in accordance with result of the classification and to convert the picture data into high quality picture image with increased resolution in a single step, wherein the picture image conversion unit eliminates distortion of the entirety or a portion of the picture image selected by the selector unit and converts such picture image into high quality picture image with increased resolution by an adaptive processing in a classification adaptive processing, wherein the picture display unit includes:

second communication unit configured to transmit a request for transmission of the picture image to the picture providing unit and to receive, from the picture providing unit, the entirety or a portion of the picture image from which distortion is eliminated so that there is provided high quality picture image.

13. A picture providing system comprising an image pick-up unit, a picture providing unit and a picture processing unit, wherein the image pick-up unit includes an image pick-up unit configured to collectively image picture image of a predetermined range, wherein the picture providing unit includes:

a first communication unit configured to receive a request for transmission of picture image from the picture processing unit and to transmit the entirety or a portion of the picture image to the picture processing unit;

a memory unit configured to store the picture image inputted from the image pick-up unit; and a selector unit configured to select the entirety or a portion of the picture image that the memory unit stores in correspondence with the request that the first communication unit has received, and wherein the picture processing unit includes:

a second communication unit configured to transmit a request for transmission of the picture image to the picture providing unit and to receive the entirety or a portion of the picture image from the providing unit; and a picture image conversion unit configured to carry out both conversion into a high quality picture image and converting the picture image into high quality picture image with increased resolution in a single step, wherein the picture image conversion unit eliminates distortion of the entirety or a portion of the picture image selected by the selector unit and converts such picture image into high quality picture image with increased resolution by an adaptive processing in a classification adaptive processing.

* * * * *